(No Model.)
A. WYNS.
TRACING APPARATUS.
No. 472,099. Patented Apr. 5, 1892.
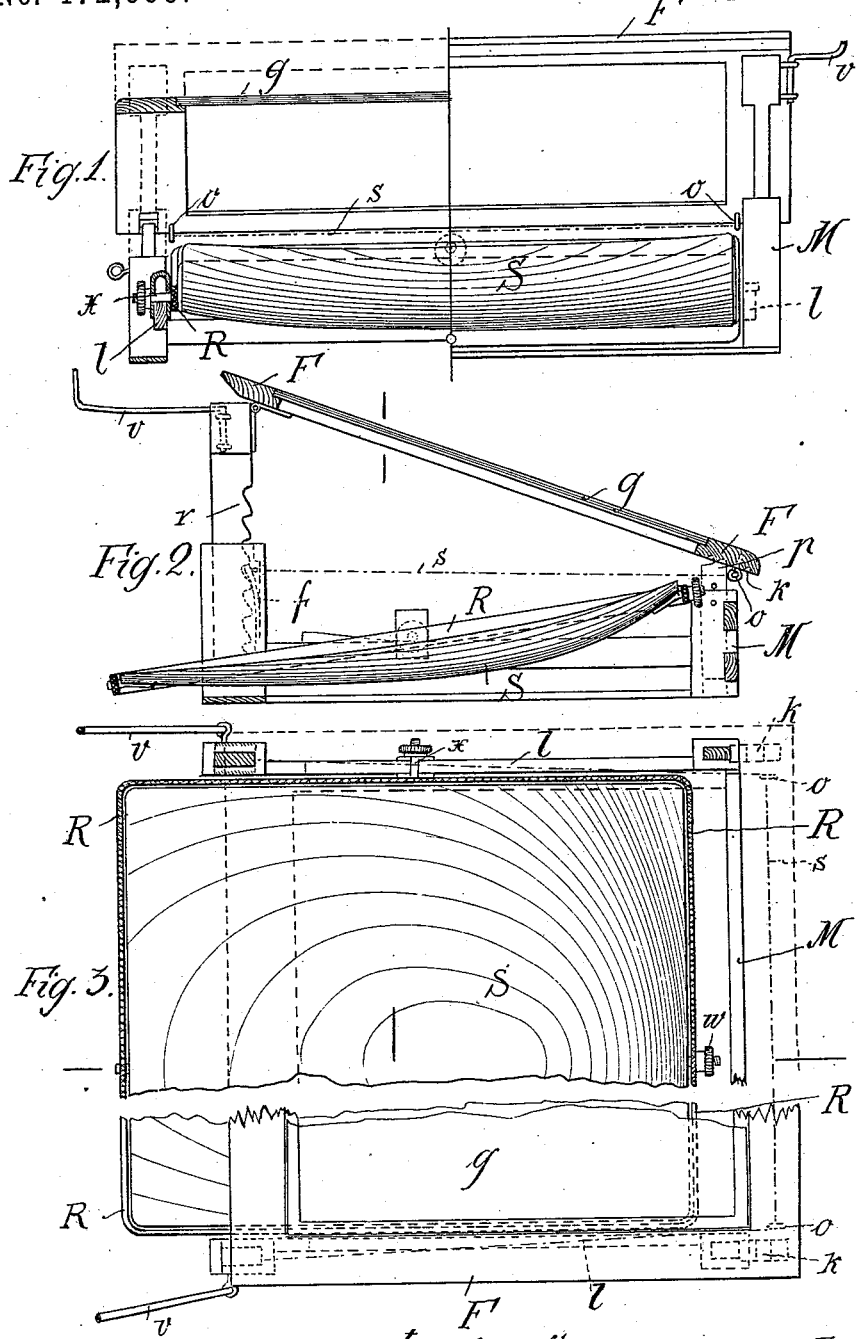
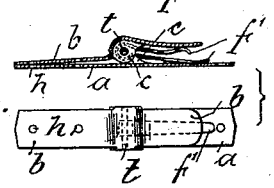
Witnesses:
H. B. Kingsbury
C. L. Northup
Inventor:
Alfred Wyns.
by Wm. E. Poulter
his Attorney

UNITED STATES PATENT OFFICE.

ALFRED WYNS, OF MÜNSTER, GERMANY.

TRACING APPARATUS.

SPECIFICATION forming part of Letters Patent No. 472,099, dated April 5, 1892.

Application filed September 2, 1891. Serial No. 404,517. (No model.)

*To all whom it may concern:*

Be it known that I, ALFRED WYNS, a subject of the King of Prussia, residing at Münster, in the Province of Westphalia, German Empire, have invented a new and useful Tracing Apparatus, of which the following is a clear and exact specification.

My invention relates to those copying apparatus whereby the drawing of one sheet is traced upon another by the aid of light penetrating the same, and the object is to increase the effect of the light. I attain this object by a mirror, which gathers the rays of light and throws them against the drawing to be traced.

In order to make my invention well understood, I refer to the accompanying drawings, in which similar letters denote similar parts throughout the several views, and in which—

Figure 1 is a partly-sectional elevation of the tracing apparatus. Fig. 2 is a cross-section; Fig. 3, a plan of the same; and Fig. 4 is a spring-clasp for holding the papers to the glass.

The sheet of glass $g$ is embedded into a wooden frame F and is adapted to have the drawing and blank sheet to be stretched over it for the sake of tracing the first onto the latter. The frame F is hinged to the racks $r$ at its higher rear end, from which side the light is supposed to come. At the front lower end the frame F is provided with notches $k$, wherein small posts $p$ catch. These posts have a row of holes, into which a pin may be stuck for adjusting its height. The spring-pawls $f$ rest with their upper bearing ends against the teeth of the racks, thus supporting the frame F at any requisite height. A string $s$ is tied to both spring-pawls $f$ and is led from one to the other by way of the two eyes $o$ on the front of the frame. Thus by pulling on the string $s$ at the front the pawls $f$ are disengaged from the racks $r$, and the frame may be lowered or raised according to need. A second frame R, being preferably made of iron, rests by two pivots $x$ on the sides $l$ of the main framing, whereon the same may slide up or down in the direction of their length. This latter frame encircles the mirror S, which may be a parabolic, hollow, or a plane mirror made of glass or metal and which may also swivel in its axis $c\ d$, having a check-screw $w$ for locking the mirror in any desired position. Now the rays of light falling on the mirror S are recast against the sheet of glass $g$ and the paper of the drawing, being more or less transparent, will permit the tracing of the drawing on the drawing or other strong paper the same as with thin tracing-paper. Although the mirror at its most curved parts will catch the weaker rays, yet by gathering the same the front and middle parts of the glass will receive the most powerful light, which by turning the mirror may be cast to any desired part of the glass, which, besides, receives the direct light. The top of the glass may be shaded by curtains to prevent direct light from falling on the glass above. For this purpose the apparatus is furnished with curtain-holders.

In Fig. 4 I illustrate a spring-clasp for holding the two sheets of paper firmly stretched across the glass. This clasp consists of two parts $a$ and $b$, preferably made of thin sheet metal. The under part $a$ is a straight piece, while the other $b$ is joggled at the center. Both are provided with lugs $c$—one on each side—in such a manner that their central holes stand opposite each other when $a$ and $b$ are put together, as illustrated on the drawings. A double-blade spring $f'$ is inserted between $a$ and $b$ where the same are standing apart in such a manner that their bearing ends, resting against the inner faces of the parts $a$ and $b$, tend to force them apart. A pin $t$ holds the complete article together. Now this may be made use of by inserting the sheets, drawing and tracing both between $a$ and the spring $f'$, whereby they are firmly held together. Several such clasps may be employed around the edges of the paper and then may be stuck to the frame F with drawing-pins. For this purpose the clasp is provided with small holes $h$. Of course clasps of this kind also may be made use of for other purposes where it is required to hold two or more sheets of paper together, and also for mounting paper on drawing-boards, without injuring the edges of the sheet.

My tracing apparatus, also, may be employed for producing copies by the direct action of the light on chemically-prepared papers, such as blue copies and the like. In this case the frame F and plate of glass $g$ may be replaced by any of the well-known

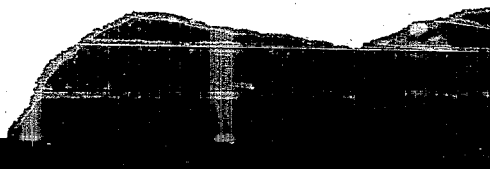

apparatus usually employed for such purpose. Thereby the mirror S will enable the copying to be accomplished in gloomier weather than has been possible heretofore and at all events shorten the time such copying will take. The apparatus when employed for this purpose will be placed in a position reverse to that shown in the drawings.

Having thus fully described the nature of my said invention and in what manner the same is to be performed, I declare that what I claim, and desire to secure by Letters Patent of the United States, is—

1. In a tracing apparatus, the combination, with a frame adapted to hold the sheet of drawing to be traced, of a mirror adapted to cast the reflected light against the drawing, said mirror being unconnected with and adapted to be adjusted independently of said frame to vary the angle of reflection, as specified.

2. In a tracing apparatus, the combination, with a frame F, adapted to hold the sheet of drawing to be traced, of a second frame R, separate from the first and provided with a mirror, said frame R adapted to be adjusted independently of the frame F to vary the angle of reflection, as specified.

3. In a tracing apparatus, the combination, with a main frame, of a frame F for holding the sheet of drawing to be traced, said frame F being adapted to be adjusted with respect to the main frame, and a frame R, provided with a mirror, said frame R being supported by the main frame separate from the frame F and adapted to be adjusted independently of the same to vary the angle of reflection, as specified.

4. In a tracing apparatus, the combination, with the main frame, of the frame F, the racks to the upper end of which the front end of the frame F is hinged, spring-pawls engaging said racks and adapted to be simultaneously operated to release the same, and the frame R, supported by said main frame and provided with a mirror, said frame being adapted to be adjusted upon said main frame, for the purpose specified.

5. In a tracing apparatus, the combination, with the main frame, of the frame F, the racks to the upper ends of which the front end of frame F is hinged, posts supporting the opposite end of said frame and engaging recesses in the latter, and a frame R, supported by the main frame and provided with a mirror, said frame R being adapted to be adjusted upon the main frame, for the purpose specified.

6. A tracing apparatus consisting of a frame F, vertically adjustable and having a sheet of glass $g$, in combination with a curved mirror S, adapted to swivel about two axes standing at right angles to each other, as and for the purpose set forth.

7. The combination of a tracing apparatus having a reflecting-mirror adapted to swivel about its axis in such a manner as to cast the reflected light combined with the direct light against the drawing to be traced, and means for mounting both sheets of paper drawing and tracing on the frame of the apparatus, as and for the purpose set forth.

8. The combination, with a tracing apparatus having a reflecting-mirror, of spring-clasps for mounting the drawings on said apparatus, consisting of an upper part $b$ and a lower part $a$, of which $b$ is joggled near the middle and both having lugs for jointly carrying a pin $t$, and a double-blade spring $f'$, inserted between said parts $a$ and $b$ on the side where they stand apart, said blade-spring being held by the pin $t$ and adapted to unite the parts $a$, $b$, and $f'$, as and for the purpose set forth.

9. As an article of manufacture, a spring-clasp consisting of an upper part $b$, joggled near the middle, and a lower part $a$, both $b$ and $a$ having side lugs $c$ and being held together by a pin $t$, in combination with a double-blade spring $f'$, inserted between the parts $a$ and $b$ where the same stand apart from each other in such a manner that the same is also held by the pin $t$ and its bearing ends rest against the inner sides of the parts $a$ and $b$, as set forth.

In testimony whereof I have signed this specification in the presence of two subscribing witnesses.

ALFRED WYNS.

Witnesses:
D. J. PARTELLO,
W. OTTO.